United States Patent
Nakao

(10) Patent No.: US 9,489,590 B2
(45) Date of Patent: Nov. 8, 2016

(54) COLOR MODE DETERMINATION APPARATUS AND NON-TRANSITORY COMPUTER READABLE MEDIUM STORING COLOR MODE DETERMINATION PROGRAM

(71) Applicant: Riso Kagaku Corporation, Tokyo (JP)

(72) Inventor: Hideo Nakao, Tsukuba (JP)

(73) Assignee: Riso Kagaku Corporation, Tokyo (JP)

( * ) Notice: Subject to any disclaimer, the term of this patent is extended or adjusted under 35 U.S.C. 154(b) by 35 days.

(21) Appl. No.: 14/488,451

(22) Filed: Sep. 17, 2014

(65) Prior Publication Data
US 2015/0078657 A1 Mar. 19, 2015

(30) Foreign Application Priority Data
Sep. 19, 2013 (JP) .................. 2013-193733

(51) Int. Cl.
G06K 9/00 (2006.01)
G06K 9/46 (2006.01)
G06F 3/12 (2006.01)
H04N 1/46 (2006.01)

(52) U.S. Cl.
CPC ............... *G06K 9/4652* (2013.01); *G06F 3/12* (2013.01); *H04N 1/46* (2013.01)

(58) Field of Classification Search
None
See application file for complete search history.

(56) References Cited

U.S. PATENT DOCUMENTS

| 6,120,197 A | 9/2000 | Kawamoto et al. |
| 2007/0024920 A1* | 2/2007 | Kishi et al. .................. 358/448 |
| 2007/0242297 A1 | 10/2007 | Eki |

FOREIGN PATENT DOCUMENTS

| JP | H10-285421 A | 10/1998 |
| JP | 2007-282027 A | 10/2007 |

* cited by examiner

*Primary Examiner* — Andrew Moyer
(74) *Attorney, Agent, or Firm* — Studebaker & Brackett PC

(57) ABSTRACT

A color mode determination apparatus includes: a color mode determining section that obtains image data including a plurality of visualization objects, performs polychrome/monochrome determination on whether the visualization object is polychromic or monochromic, and performs color mode determination on whether the image data is polychromic image data or monochromic image data based on a result of the polychrome/monochrome determination; and an overlap determining section that determines whether a predetermined visualization object is overlapped with other visualization objects when the polychrome/monochrome determination is performed for the predetermined visualization object. The color mode determining section changes a determination target range of the polychrome/monochrome determination depending on whether the predetermined visualization object is overlapped with other visualization objects.

4 Claims, 5 Drawing Sheets

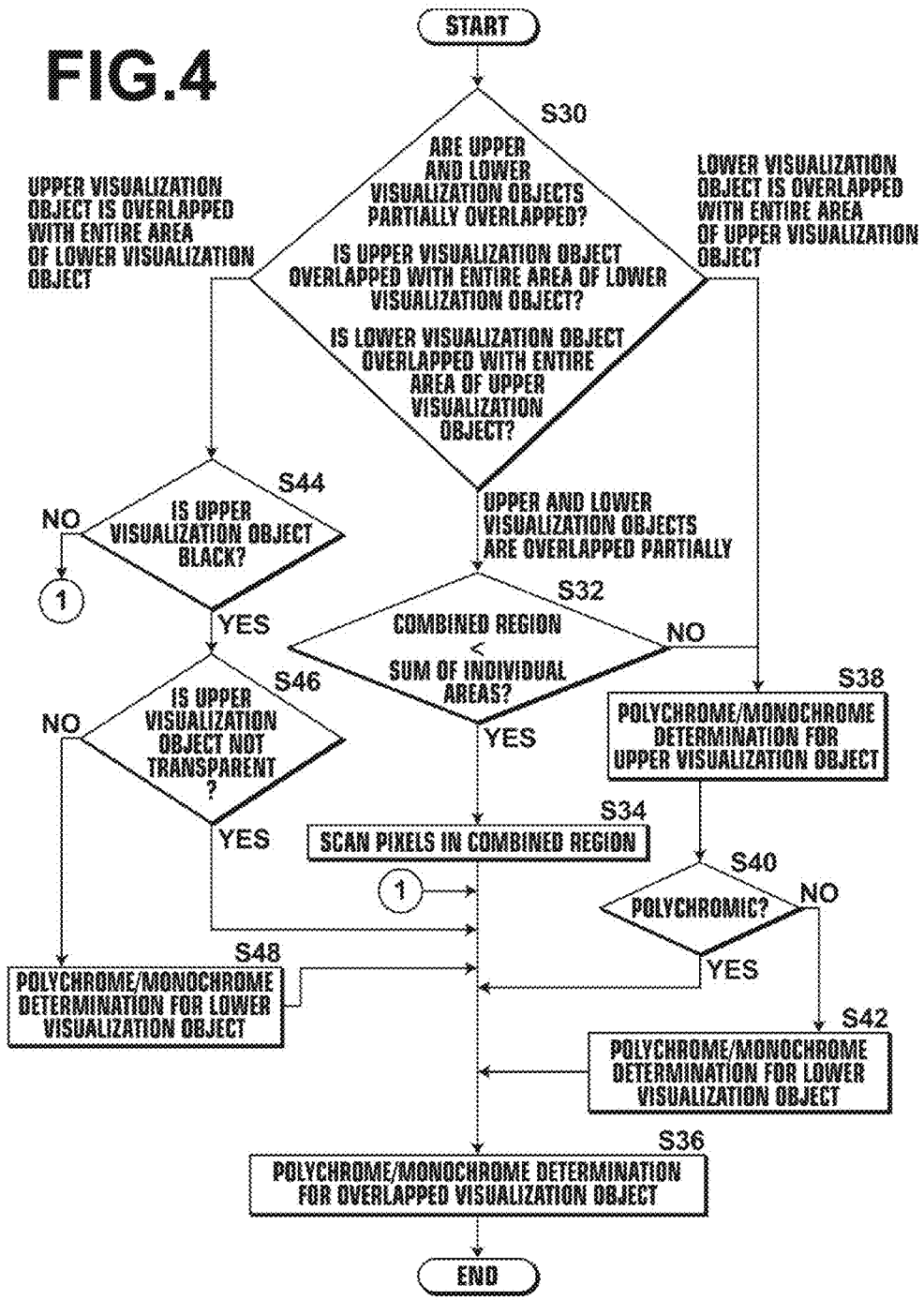

COLOR MODE DETERMINATION APPARATUS AND NON-TRANSITORY COMPUTER READABLE MEDIUM STORING COLOR MODE DETERMINATION PROGRAM

CROSS-REFERENCE TO RELAYED APPLICATIONS

The present application claims priority under 35 U.S.C. §119 to Japanese Patent Application No. 2013-193733 filed on Sep. 19, 2013, the content of which is hereby expressly incorporated herein by reference in its entirety.

TECHNICAL FIELD

The present invention relates to a color mode determination apparatus and a non-transitory computer readable medium storing a color mode determination program for performing color mode determination on whether image data including a plurality of visualization objects is polychromic image data or monochromic image data.

BACKGROUND ART

In the related art, there has been discussed a method of automatically determining whether image data created using an editing application such as Microsoft Word® is polychromic image data or monochromic image data and performing a print processing by selecting a polychromic mode or a monochromic mode using a printer device such as an inkjet printer or a laser printer depending on the determination result (refer to Japanese Unexamined Patent Publication Nos. 10(1998)-285421 and 2007-282027).

As a method of determining whether image data is polychromic image data or monochromic image data, for example, there is known a method of analyzing whether there is a polychromic pixel out of pixels included in the image data and determining that the image data is polychromic if there is a polychromic pixel.

SUMMARY OF THE INVENTION

However, in the determination method described above, it is necessary to scan and analyze all of the pixels of the image data on whether they are polychromic pixels. Therefore, if a significant number of pages are scanned, it takes a long time disadvantageously.

In the technique of Japanese Unexamined Patent Publication No. 2007-282027, determination is not performed by scanning all of the pixels unlike in the aforementioned method. Instead, polychrome/monochrome determination is performed for each visualization object representing a visualization target included in image data. If there is a polychromic visualization object, the image data is determined as polychromic image data.

However, even when the polychrome/monochrome determination is performed by scanning each pixel of all of the visualization objects, this also takes a long time in some cases. In addition, the technique of Japanese Unexamined Patent Publication No. 2007-282027 fails to consider the polychrome/monochrome determination when a plurality of visualization objects are overlapped with each other.

The present invention has been developed in view of the aforementioned problems. It is an object of the present invention to provide a color mode determination apparatus and a non-transitory computer readable medium storing a color mode determination program, capable of further efficiently performing polychrome/monochrome determination when a plurality of visualization objects are overlapped with each other.

According to an aspect of the present invention, there is provided a color mode determination apparatus including: a color mode determining section that obtains image data including a plurality of visualization objects representing visualization targets, performs polychrome/monochrome determination on whether the visualization object is polychromic or monochromic, and performs color mode determination on whether the image data is polychromic image data or monochromic image data based on a result of the polychrome/monochrome determination; and an overlap determining section that determines whether a predetermined visualization object is overlapped with other visualization objects when the polychrome/monochrome determination is performed for the predetermined visualization object, wherein the color mode determining section changes a determination target range of the polychrome/monochrome determination depending on whether the predetermined visualization object is overlapped with other visualization objects.

In the color mode determination apparatus described above, if the overlap determining section determines that the predetermined visualization object is partially overlapped with other visualization objects, a size of a combined region obtained by combining a rectangular region of the predetermined visualization object and a rectangular region of the other visualization objects into a single rectangular region may be compared with a value obtained by adding a size of the rectangular region of the predetermined visualization object and a size of the rectangular region of the other visualization objects by considering them as individual rectangular regions, the combined region may be determined as a determination target range of the polychrome/monochrome determination when the size of the combined region is smaller than the value obtained by the addition, and each of the individual rectangular regions may be determined as the determination target range of the polychrome/monochrome determination when the value obtained by the addition is smaller than the size of the combined region.

In the color mode determination apparatus described above, if the value obtained by the addition is smaller than the size of the combined region, and each of the individual rectangular regions is determined as the determination target range of the polychrome/monochrome determination, the color mode determining section may perform the polychrome/monochrome determination sequentially from an upper visualization object on a print medium when the image data is printed and determine that the image data is polychromic image data without performing the polychrome/monochrome determination for a lower visualization object arranged under the upper visualization object which has been determined as being polychromic when the upper visualization object is determined as being polychromic.

In the color mode determination apparatus described above, if the overlap determining section determines that the upper visualization object on a print medium when the image data is printed is overlapped to cover the entire area of the lower visualization object, the color mode determining section may perform the polychrome/monochrome determination sequentially from the upper visualization object and determine whether the upper visualization object is black and whether an uncovering process is performed, the polychrome/monochrome determination may be not performed for the lower visualization object when the upper visualization object is black, and the uncovering process is not performed, and the polychrome/monochrome determination may be performed for the lower visualization object when the upper visualization object is black, and the uncovering process is performed.

In the color mode determination apparatus described above, if the overlap determining section determines that the lower visualization object on a print medium when the image data is printed is overlapped to cover the entire area of the upper visualization object, the color mode determining section may perform the polychrome/monochrome determination sequentially from the upper visualization object, and it may be determined that the image data is polychromic image data in the color mode determination without performing the polychrome/monochrome determination for the lower visualization object arranged under the upper visualization object which has been determined as being polychromic when the upper visualization object is determined as being polychromic.

According to another aspect of the present invention, there is provided a non-transitory computer readable medium having a color mode determination program stored therein, the color mode determination program causing a computer to function as: a color mode determining section that obtains image data including a plurality of visualization objects representing visualization targets, performs polychrome/monochrome determination on whether the visualization object is polychromic or monochromic, and performs color mode determination on whether the image data is polychromic image data or monochromic image data based on a result of the polychrome/monochrome determination; and an overlap determining section that determines whether a predetermined visualization object is overlapped with other visualization objects when the polychrome/monochrome determination is performed for the predetermined visualization object, wherein the color mode determining section changes a determination target range of the polychrome/monochrome determination depending on whether the predetermined visualization object is overlapped with other visualization objects.

In the color mode determination apparatus and the color mode determination program, it is determined whether a predetermined visualization object is overlapped with other visualization objects when polychrome/monochrome determination is performed for the predetermined visualization object. In addition, a determination target range of the polychrome/monochrome determination changes depending on whether a predetermined visualization object is overlapped with other visualization objects. Therefore, if the determination target range of the polychrome/monochrome determination in a case when the predetermined visualization object is overlapped is set to be narrower than that in a case when the predetermined visualization object is not overlapped, it is possible to further efficiently perform the polychrome/monochrome determination for the visualization object. Moreover, it is possible to further efficiently perform color mode determination for the image data.

For example, if a predetermined visualization object is partially overlapped with other visualization objects, a combined region obtained by combining a rectangular region of the predetermined visualization object and a rectangular region of other visualization objects is compared with a value obtained by adding the sizes of the rectangular region of the predetermined visualization object and the rectangular region of the other visualization objects as an individual rectangular region. When the combined region is smaller than the value obtained by the addition, the combined region is set as a determination target range of polychrome/monochrome determination. When the value obtained by the addition is smaller than the combined region, and each of the individual rectangular regions is set as the determination target range of the polychrome/monochrome determination, it is possible to set a narrower determination target range due to the overlapping state of the visualization objects. Accordingly, it is possible to efficiently perform the polychrome/monochrome determination for the visualization object.

If the value obtained by addition is smaller than the combined region, and each of the individual rectangular regions is set as a determination target range of polychrome/monochrome determination, the polychrome/monochrome determination is performed sequentially from the upper visualization object on a print medium when image data is printed. When the upper visualization object is determined as being polychromic, the polychrome/monochrome determination is not performed for the lower visualization object arranged under the visualization object which has been determined as being polychromic. Since the polychrome/monochrome determination is not performed for the lower visualization object when the image data is determined as being polychromic image data, it is possible to efficiently perform color mode determination accordingly.

If it is determined that the upper visualization object is overlapped to cover the entire area of the lower visualization object, the polychrome/monochrome determination is performed sequentially from the upper visualization object. In addition, it is determined whether the upper visualization object is black and whether an uncovering process is performed. When it is determined that the upper visualization object is black, and the uncovering process is not performed, the polychrome/monochrome determination is not performed for the lower visualization object. In this case, since the polychrome/monochrome determination is not performed for the lower visualization object, it is possible to efficiently perform color mode determination accordingly.

If it is determined that the upper visualization object is black, and the uncovering process is performed, and the polychrome/monochrome determination is performed for the lower visualization object, it is possible to appropriately determine the lower visualization object as being polychromic even when the lower visualization object is polychromic, and the uncovering process is performed for the upper visualization object.

BRIEF DESCRIPTION OF THE DRAWINGS

FIG. 4 is a flowchart for describing color mode determination in the color mode determination apparatus according to an embodiment of the present invention;

DESCRIPTION OF THE EMBODIMENTS

Figure 1:
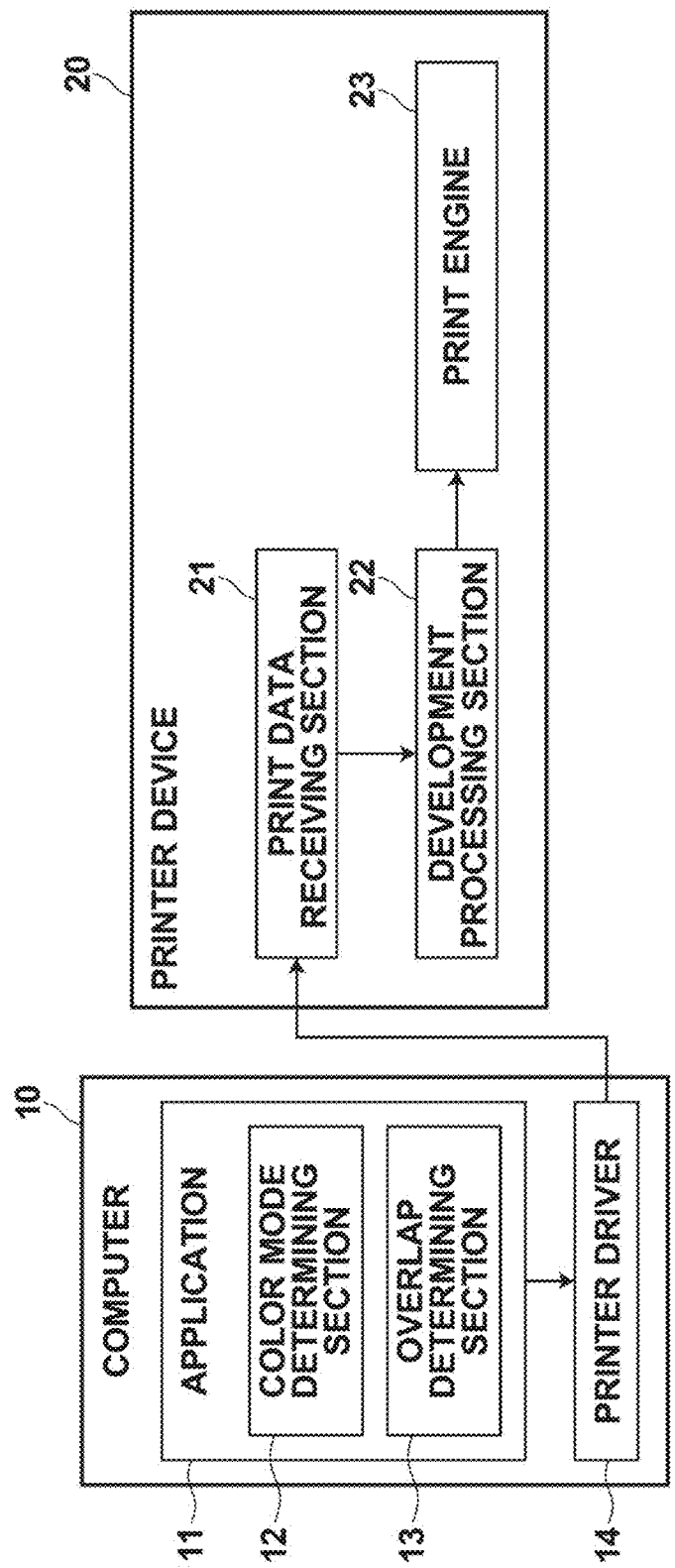
FIG. 1 is a block diagram illustrating the schematic configuration of a printer system using a color mode determination apparatus according to an embodiment of the present invention.

Hereinafter, a printer system using a color mode determination apparatus and a color mode determination program according to an embodiment of the present invention will be described in detail with reference to the accompanying drawings. FIG. 1 is a schematic block diagram illustrating the entire printer system according to the present embodiment.

The printer system according to the present embodiment includes a computer 10 and a printer device 20 connected to the computer 10 via a network such as a wired/wireless local area network (LAN) as illustrated in FIG. 1.

The computer 10 includes an application 11 and a printer driver 14 as illustrated in FIG. 1. The application 11 and the printer driver 14 may be a program installed in the computer 10. The application 11 corresponds to a color mode determination program according to the present invention. This application 11 is operated by a central processing unit (CPU) of the computer 10 to function as the color mode determination apparatus of the present invention.

Figure 2:
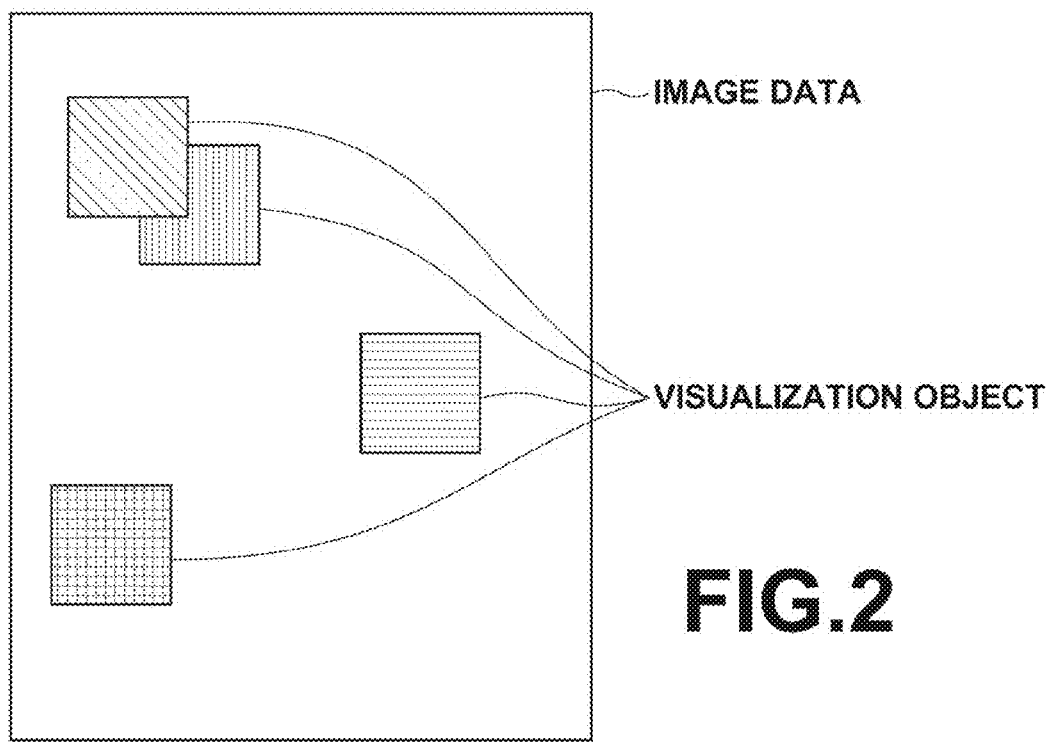
FIG. 2 is a diagram illustrating exemplary image data having a plurality of visualization objects.

The application 11 is a program capable of creating and editing image data including a plurality of visualization objects representing visualization targets. The visualization objects according to the present embodiment are arranged as rectangular regions in the image data on a page basis as illustrated in FIG. 2. The visualization object may be bitmap data such as a photographic image, or text data, which is not bitmap data, or vector data representing a figure such as a line or a rectangular shape. In the present embodiment, the visualization object including the bitmap data described above will be referral to as a picture visualization object, and the visualization object including text data or vector data will be referred to as a figure visualization object.

The picture visualization object contains, in addition to the bitmap data, attribute information representing a type of the visualization object and coordinate information representing a position and a size in the image data. In addition, each pixel of the bitmap data of the picture visualization object includes a value representing a transparency. An uncovering process of the printer driver 14 is performed based on the transparency. It is noted that a zero percentage of the transparency means that no uncovering process is performed.

The figure visualization object contains, in addition to text data or vector data, attribute information representing a type, color attribute information, transparency attribute information, and coordinate information representing a position and a size in the image data of the visualization object. The color attribute information represents a color for printing the figure visualization object and includes red (R) color information, green (G) color information, and blue (B) color information. Each of the R, G, and B color information is represented as a value on a scale from 0 to 255, and the color is visualized based on each value of the scale. It is noted that all of the attributes for the R, G, and B colors are set to zero in the case of a black color. It is also noted that, since each pixel of bitmap data for a picture visualization object has information on colors (R-signal, G-signal, and B-signal), it is not necessary to set the color attribute information for the picture visualization object. However, attribute information representing polychrome or monochrome may also be set.

The transparency attribute information of the figure visualization object is not set for each pixel, unlike the transparency included in the bitmap data of the picture visualization object. Instead, a single piece of the transparency attribute information is set for a single visualization object. In addition, the uncovering process for the figure visualization object is performed in the printer driver 14 based on the transparency attribute information.

The application 11 according to the present embodiment includes a color mode determining section 12 and an overlap determining section 13.

The color mode determining section 12 designates a visualization object included in the image data based on the corresponding coordinate information and performs polychrome/monochrome determination on whether the designated visualization object is polychromic or monochromic. In addition, the color mode determining section 12 performs color mode determination on whether the image data is polychromic image data or monochromic image data based on a result of the polychrome/monochrome determination for each visualization object. If it is determined that the image data is polychromic image data, the color mode determining section 12 outputs information representing that the color mode is set to "polychrome" to the printer driver 14. If it is determined that the image data is monochromic image data, the color mode determining section 12 outputs information representing that the color mode is "monochrome" to the printer driver 14.

Here, when a plurality of visualization objects included in the image data are not overlapped with each other, the color mode determining section 12 sets each individual rectangular region of each visualization object as a determination target range, and the polychrome/monochrome determination is performed for each of the individual rectangular regions.

Specifically, in the case of a picture visualization object, each pixel of the bitmap data in the individual rectangular region is scanned, and signal levels of the R-signal, the G-signal, and the B-signal of each pixel are confirmed. If the signal levels of the all of the signals are not 255 or 0, it is determined that the corresponding pixel is a polychromic pixel. If all of the R-signal, the G-signal, and the B-signal have a signal level of zero, the corresponding pixel is a black pixel. If all of the R-signal, the G-signal, and the B-signal have a signal level of 255, the corresponding pixel is a white pixel. In addition, if it is determined that any one of all of the pixels of the bitmap data is a polychromic pixel, a picture visualization object including the corresponding polychromic pixel is determined as being polychromic. Meanwhile, if all of the pixels of the bitmap data are not polychromic pixels, that is, if all of the pixels of the bitmap data are black or white pixels, the corresponding picture visualization object is determined as being monochromic.

In the case of a figure visualization object, the color attribute information of the corresponding visualization object is confirmed. If the color attribute information does not represent "black," the corresponding visualization object is determined as being polychromic. If the color attribute information represents "black," the corresponding visualization object is determined as being monochromic.

If any one of the visualization objects is determined as being polychromic, the color mode determining section 12 determines that the image data is polychromic image data and outputs, to the printer driver 14, information indicating that the color mode is "polychromic." Otherwise, if all of the visualization objects are determined as being monochromic, the color mode determining section 12 determines that the corresponding image data is monochromic image data and outputs, to the printer driver 14, information indicating that the color mode is "monochromic."

Meanwhile, if there is an overlapping visualization object out of a plurality of visualization objects included in the image data, the color mode determining section 12 changes the determination target range of polychrome/monochrome determination for the overlapping visualization object. Specifically, the color mode determining section 12 changes the determination target range of polychrome/monochrome determination by discriminating between a case when there is an overlapping visualization object and a case when there is no overlapping visualization object. Note that the method of determining the determination target range of polychrome/monochrome determination when there is an overlapping visualization object will be described below.

The overlap determining section 13 determines whether a predetermined visualization object is overlapped with other visualization objects when the color mode determining section 12 performs polychrome/monochrome determination for the predetermined visualization object. The overlap determining section 13 determines whether a predetermined visualization object is overlapped with other visualization objects based on the coordinate information of each visualization object. In addition, if a predetermined visualization object is overlapped with other visualization objects, the overlap determining section 13 outputs this fact to the color mode determining section 12.

It is noted that the application 11 may be configured as a single program. For example, in the case of a program capable of creating and editing image data, such as Microsoft Word®, a program serving as the color mode determining section 12 and the overlap determining section 13 described above may be added as a plug-in program.

The printer driver 14 has a user interface for receiving user's input regarding a print condition such as a color mode, the number of print pages, the number of copies, and a zoom-in/out ratio. The printer driver 14 creates and outputs print data recognizable by the printer device 20 depending on the print condition. The printer driver 14 according to the present embodiment creates, for example, page description language (PDL) data as the print data. It is noted that the print condition is input using a predetermined input unit such as a keyboard or a mouse provided in the computer 10.

As the color mode, "polychrome," "monochrome," and "automatic" modes are selectable. If a user selects, as a color mode, "polychrome" or "monochrome," the printer driver 14 creates print data containing this fact and outputs the print data to the printer device 20. Otherwise, if a user selects "automatic" as a color mode, the printer driver 14 creates print data containing "polychrome/monochrome" information output from the color mode determining section 12 of the application 11 and outputs the print data to the printer device 20.

The printer device 20 includes a print data receiving section 21, a development processing section 22, and a print engine 23 as illustrated in FIG. 1.

The print data receiving section 21 receives the print data output from the printer driver 14 of the computer 10.

The development processing section 22 analyzes the print data as PDL data and performs a development process, a color conversion process, a halftone process, and the like based on the print condition such as a color mode included in the print data so as to create printing bitmap data. It is noted that the development process, the color conversion process, or the halftone process is performed differently depending on a type of the print engine 23, a color mode, and the like. Since such processes are already known in the art, a description thereof will be omitted.

The print engine 23 performs a print process on a print sheet based on the printing bitmap data created by the development processing section 22. For example, the print engine 23 may include a stencil printer, an inkjet printer, a laser printer, and the like.

Figure 3:
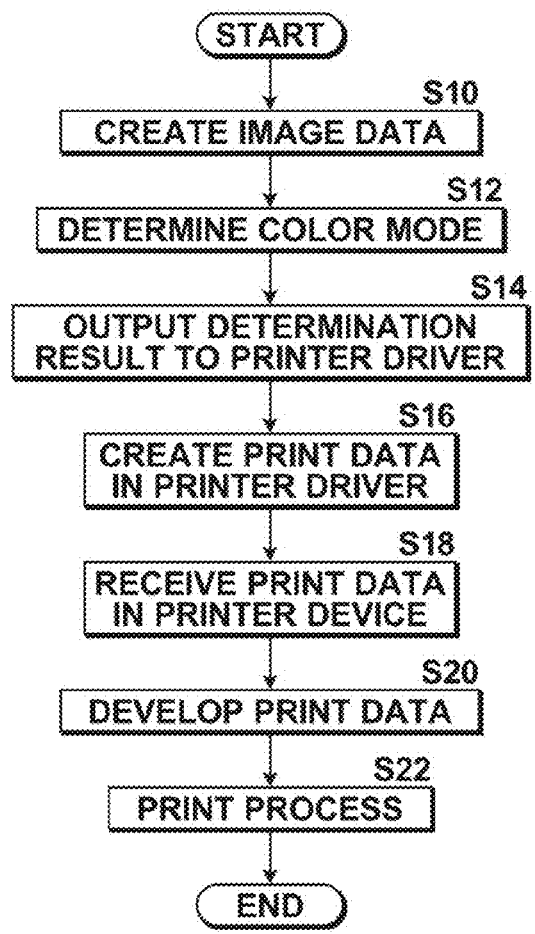
FIG. 3 is a flowchart for describing a general flow from generation of image data to a print processing in the printer system of FIG. 1.

Next, the functional effects of the printer system according to an embodiment of the present embodiment will be described with reference to the flowcharts of FIGS. 3 and 4. FIG. 3 is a flowchart for describing a general flow from generation of image data to the print process in the printer system according to the present embodiment. FIG. 4 is a flowchart for describing color mode determination of the image data in detail. First, a description will be given with reference to the flowchart of FIG. 3. Note that a description will be given by assuming that "automatic" is selected as the color mode here.

First, a user activates the application 11 of the computer 10. A picture visualization object or a figure visualization object is arranged using this application 11 to create image data in units of pages (S10).

As a print instruction is selected on the application 11, a user interface of the printer driver 14 is activated, so that a print condition receiving screen is displayed for receiving an input for the print condition such as a color mode, and a user sets a print condition such as a color mode on the print condition receiving screen.

Then, as the print instruction is selected on the print condition receiving screen, the image data created by the application 11 is output to the printer driver 14. However, in this case, if "automatic" is selected as a color mode, the application 11 performs color mode determination on whether the image data is polychromic image data or monochromic image data (S12). A result of the color mode determination is output to the printer driver 14 together with the image data (S14).

The printer driver 14 receives the image data and the result of the color mode determination and creates print data based thereon (S16). The print data created by the printer driver 14 is output to the printer device 20 and is received by the print data receiving section 21 of the printer device 20 (S18).

The print data receiving section 21 outputs the received print data to the development processing section 22. The development processing section 22 performs a development process, a color conversion process, a halftone process, and the like depending on the type of the color mode of the input print data to create the printing bitmap data and outputs the printing bitmap data to the print engine 23 (S20).

The bitmap data output from the development processing section 22 is input to the print engine 23. The print engine 23 performs a print process on a print sheet based on the input bitmap data (S22).

Hereinbefore, a description has been given for a general flow from generation of the image data to the print process in the printer system according to the present embodiment.

Next, a method of polychrome/monochrome determination for a visualization object when there is an overlapping visualization object in the color mode determination performed in step S12 of FIG. 3 will be described in detail with reference to the flowchart of FIG. 4.

First, if a predetermined visualization object is overlapped with other visualization objects when the color mode determining section 12 performs polychrome/monochrome determination for the predetermined visualization object, the overlap determining section 13 determines an overlapping state between the predetermined visualization object and other visualization objects.

The color mode determining section 12 changes a determination target range of the polychrome/monochrome determination based on the overlapping state of the visualization object. It is noted that a description here will be given for a case where picture visualization objects are overlapped with each other.

Figure 5A:
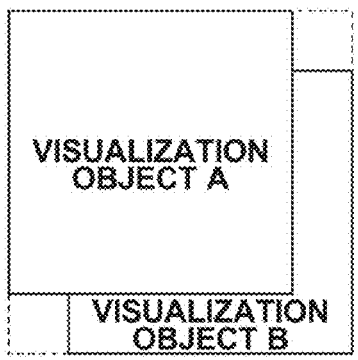
FIG. 5A is a diagram illustrating an exemplary case where a plurality of visualization objects are partially overlapped with each other.
Figure 5B:
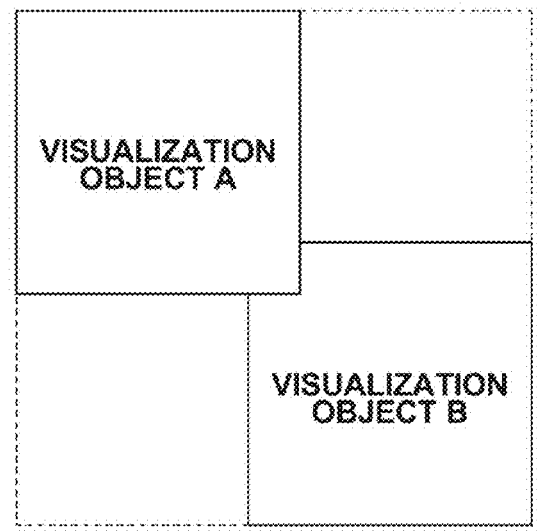
FIG. 5B is a diagram illustrating an exemplary case where a plurality of visualization objects are partially overlapped with each other.
Figure 6A:
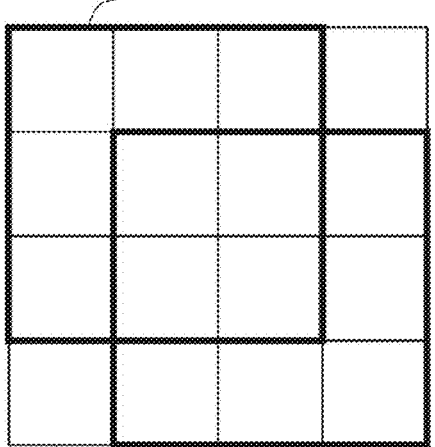
FIG. 6A is a diagram for describing polychrome/monochrome determination when a plurality of visualization objects are partially overlapped with each other as illustrated in FIG. 5A.
Figure 6B:
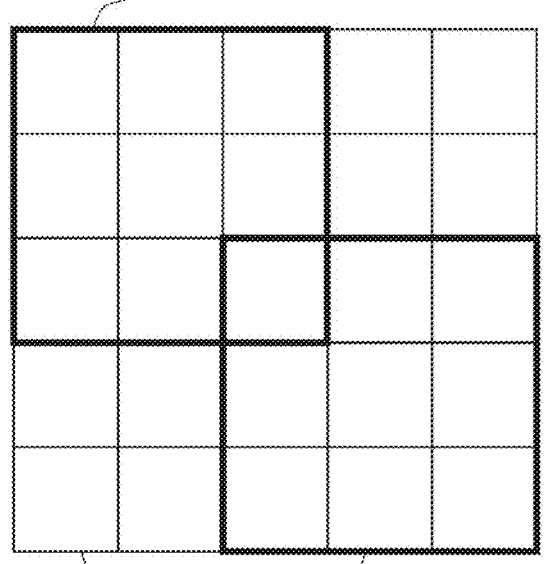
FIG. 6B is a diagram for describing polychrome/monochrome determination when a plurality of visualization objects are partially overlapped with each other as illustrated in FIG. 5B.

Specifically, if a predetermined visualization object A is partially overlapped with another visualization object B, for example, as illustrated in FIG. 5A or 5B (S30, partially overlapped), the color mode determining section 12 sets a combined region by combining a rectangular region of the visualization object A and a rectangular region of the visualization object B into a single rectangular region as illustrated in FIG. 6A or 6B. It is noted that FIG. 6A illustrates a combined region set when the visualization object A is overlapped with the visualization object B as illustrated in FIG. 5A, and FIG. 6B illustrates a combined region set when the visualization object A is overlapped with the visualization object B as illustrated in FIG. 5B. In addition, the squares illustrated in FIGS. 6A and 6B represent each pixel of the visualization object.

The color mode determining section 12 compares an area of the combined region set as illustrated in FIGS. 6A and 6B with a value obtained by adding the areas of the rectangular regions of the visualization objects A and B by considering them as individual rectangular regions (S38). Specifically, in the case of FIG. 6A, the area of the combined region becomes 4×4=16 pixels. The value obtained by adding the areas of the individual rectangular regions becomes 9+9=18 pixels. In the case of FIG. 6B, the area of the combined region becomes 5×5=25 pixels, and the value obtained by adding the areas of the individual rectangular regions becomes 9+9=18 pixels.

If the area of the combined region is smaller than the value obtained by adding the areas of the individual rectangular regions as illustrated in FIG. 6A (YES in step S32), the color mode determining section 12 sets the corresponding combined region as a determination target range of polychrome/monochrome determination. That is, 16 pixels in the combined region are scanned (S34), and it is determined whether each pixel is a polychromic pixel or a monochromic pixel. If it is determined that any one of the pixels is a polychromic pixel, the combined region of the overlapping visualization objects A and B is determined as being polychromic. If it is determined that all of the pixels are monochromic pixels, the combined region is determined as being monochromic (S36). In addition, the color mode determining section 12 determines a color mode of the image data based on the result of the polychrome/monochrome determination of the corresponding combined region and the result of polychrome/monochrome determination of other visualization objects.

It is noted that, in order to scan the pixels in a part of the area when the visualization objects A and B are overlapped, the signal levels of the R-signal, the G-signal, and the B-signal in the pixels of both the visualization objects A and B are recognized in the scanning of a single pixel. In the case of FIG. 6A, a scanning time is necessary for a total of 18 pixels if the pixels in individual rectangular regions are scanned. However, by scanning the pixels in the overlapping area as described above, it is possible to reduce the number of scanned pixels to 16 pixels and shorten the scanning time accordingly.

Meanwhile, if the value obtained by adding the areas of the individual rectangular regions is smaller than the area of the combined region as illustrated in FIG. 6B (NO in step S32), the color mode determining section 12 selects each of the individual rectangular regions as a determination target range of the polychrome/monochrome determination.

In this case, the color mode determining section 12 performs polychrome/monochrome determination sequentially from the upper visualization object out of a plurality of the overlapping visualization objects (S38). Here, the upper visualization object refers to a visualization object arranged in an upper side on a print sheet where the image data is printed. In the case of FIG. 5B, the visualization object A is the upper visualization object, and the polychrome/monochrome determination is performed first for the upper visualization object A.

The color mode determining section 12 scans 9 pixels in the rectangular region of the upper visualization object A and determines whether each pixel is a polychromic pixel or a monochromic pixel. If any one of the pixels is a polychromic pixel, the visualization object A is determined as being polychromic (YES in step S40). In this case, a result of the polychrome/monochrome determination for the area of the overlapping visualization objects A and B is determined as being polychromic without performing the polychrome/monochrome determination for the lower visualization object B (S36).

Meanwhile, if all of the pixels in the rectangular region of the visualization object A are monochromic pixels, and the visualization object A is determined as being monochromic (NO in step S40), then, 9 pixels in the rectangular region of the lower visualization object B are scanned, and the polychrome/monochrome determination of the visualization object B is performed by determining whether each pixel is a polychromic pixel or a monochromic pixel (S42).

If the lower visualization object B is determined as being polychromic, the color mode determining section 12 determines the result of the polychrome/monochrome determination for the area of the overlapping visualization objects A and B as being polychromic. If the lower visualization object B is determined as being monochromic, the color mode determining section 12 determines the result of the polychrome/monochrome determination for the area of the overlapping visualization objects A and B as being monochromic (S36). In addition, the color mode determining section 12 determines a color mode of the image data based on the result of the polychrome/monochrome determination for the area of the overlapping visualization objects A and B and the result of the polychrome/monochrome determination for other visualization objects.

In the case of FIG. 6B, if each pixel of the combined region is scanned, it is necessary to scan a total of 25 pixels. However, if the pixels in the individual rectangular region are scanned as described above, the number of scanned pixels is reduced to 18 pixels, so that the scanning time is shortened accordingly. Furthermore, as described above, if the upper visualization object is determined as being polychromic, and the polychrome/monochrome determination is not performed for the lower visualization object, it is possible to further reduce the number of scanned pixels to 9 pixels and shorten the scanning time accordingly.

Next, a description will be given for a case when the visualization objects are not partially overlapped with each other, but the rectangular region of one of the visualization objects covers the entire area of the rectangular region of the other visualization object.

Figure 7A:
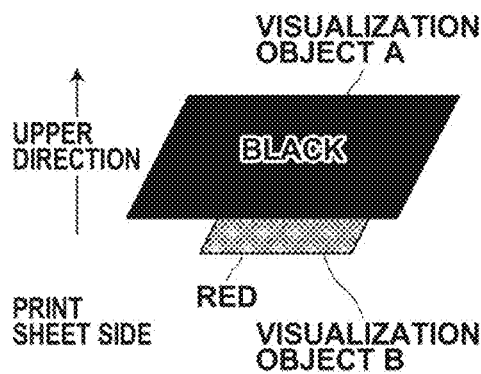
FIG. 7A is a diagram for describing polychrome/monochrome determination when an upper visualization object covers the entire area of a lower visualization object.
Figure 7B:
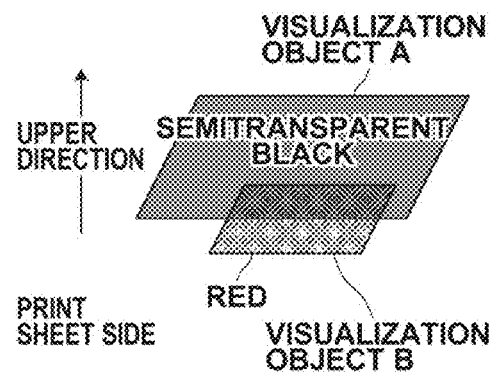
FIG. 7B is a diagram for describing polychrome/monochrome determination when an upper visualization object covers the entire area of a lower visualization object.

First, if the visualization objects are overlapped with each other such that the rectangular region of the upper visualization object covers the entire area of the rectangular region of the lower visualization object B as illustrated in FIGS. 7A and 7B (S36, the upper visualization object covers the entire area of the lower visualization object), the polychrome/monochrome determination is also performed sequentially from the upper visualization object A. In addition, it is determined whether all of the pixels of the upper visualization object A are black, and whether an uncovering process is performed. If it is determined that all of the pixels of the upper visualization object A are black, and the uncovering process is not performed (YES in step S44 and YES in step S46), the result of the polychrome/monochrome determination for the area of the overlapping visualization objects A and B is determined as being monochromic without performing polychrome/monochrome determination for the lower visualization object B (S36). Similarly, in this case, since the polychrome/monochrome determination for the lower visualization object B is not performed, it is possible to reduce the number of scanned pixels and shorten the scanning time accordingly.

As an example of the image data illustrated in FIG. 7A, in which the entire area of the polychromic visualization object B is covered by the black visualization object A, image data created by presentation software may be exemplified. In the case of the image data created by presentation software, the upper visualization object may be temporarily removed to show the lower visualization object, or the upper visualization object may be temporarily displayed to hide the lower visualization object. The polychrome/monochrome determination method described above may be used when such image data is printed by hiding the lower visualization object using the upper black visualization object. Alternatively, without limiting to the image data created by presentation software described above, the polychrome/monochrome determination method described above may be employed when the image data created by spreadsheet software is printed by covering a cell having a polychromic numeral with a black cell.

Meanwhile, if it is determined that a polychromic pixel is included in the upper visualization object A in step S44 (NO), the result of the polychrome/monochrome determination for the area of the overlapping visualization objects A and B is determined as being polychromic without performing the polychrome/monochrome determination for the lower visualization object B (S36). In addition, the color mode determining section 12 determines a color mode of the image data based on the result of the polychrome/monochrome determination for the area of the overlapping visualization objects A and B and the result of the polychrome/monochrome determination for other visualization objects. Similarly, in this case, since the polychrome/monochrome determination for the lower visualization object B is not performed, it is possible to reduce the number of scanned pixels and shorten the scanning time accordingly.

If it is determined that the uncovering process is performed in step S46 (NO) even when it is determined that all of the pixels of the upper visualization object A are black in step S44 (YES), the polychrome/monochrome determination for the lower visualization object B is performed (S48). In this case, the color of the lower visualization object B is printed by uncovering the upper visualization object A even when the upper visualization object A is black.

The color mode determining section 12 determines the result of the polychrome/monochrome determination for the area of the overlapping visualization objects A and B as being polychromic when the lower visualization object B is polychromic. Otherwise, the color mode determining section 12 determines the result of the polychrome/monochrome determination for the area of the overlapping visualization objects A and B as being monochromic when the lower visualization object B is monochromic (S36).

In addition, the color mode determining section 12 determines a color mode of image data based on the result of the polychrome/monochrome determination for the area of the overlapping visualization object A and B and the result of the polychrome/monochrome determination for other visualization objects.

Next, a description will be given for a case when the lower visualization object is larger than the upper visualization object, and it is determined that the lower visualization object covers the entire area of the upper visualization object (S30, when the lower visualization object overlaps the entire area of the upper visualization object) on the contrary to the overlapping state of FIGS. 7A and 7B.

Figure 7C:
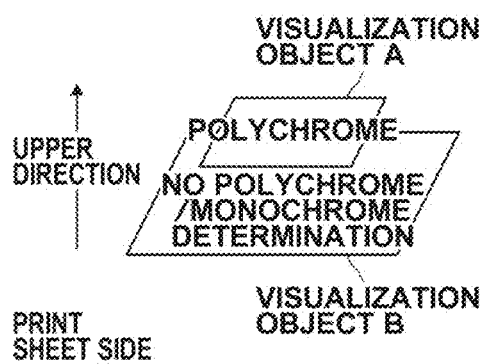
FIG. 7C is a diagram for describing polychrome/monochrome determination when a lower visualization object is overlapped with the entire area of an upper visualization object.

Similarly, in this case, the color mode determining section 12 performs polychrome/monochrome determination sequentially from the upper visualization object. Similarly, in this case, if the upper visualization object is determined as being polychromic as illustrated in FIG. 7C (YES in steps S38 and S40), the result of the polychrome/monochrome determination for the area of the overlapping visualization objects A and B is determined as being polychromic without performing the polychrome/monochrome determination for the lower visualization object arranged under the visualization object determined as being polychromic (S36).

Figure 7D:
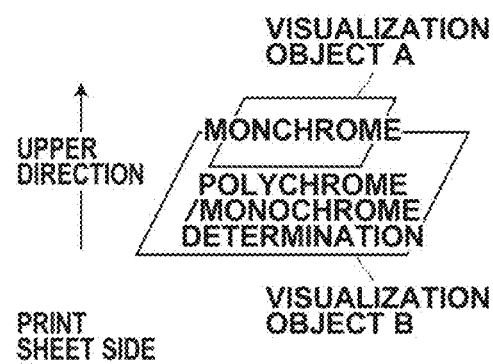
FIG. 7D is a diagram for describing polychrome/monochrome determination when a lower visualization object is overlapped with the entire area of an upper visualization object.

Meanwhile, if the upper visualization object A is determined as being monochromic as illustrated in FIG. 7D (NO in step S40), then, the polychrome/monochrome determination is performed for the lower visualization object (S42).

If the lower visualization object is determined as being polychromic, the color mode determining section 12 determines the result of the polychrome/monochrome determination for the area of the overlapping visualization objects A and B as being polychromic. If the lower visualization object B is determined as being monochromic, the color mode determining section 12 determines the result of the polychrome/monochrome determination for the area of the overlapping visualization objects A and B as being monochromic (S36). In addition, the color mode determining section 12 determines a color mode of image data based on the result of the polychrome/monochrome determination for the area of the overlapping visualization objects A and B and the result of the polychrome/monochrome determination of other visualization objects.

Hereinbefore, a description has been given for a polychrome/monochrome determination method for a visualization object when there are overlapping visualization objects.

Although it is assumed that picture visualization objects are overlapped with each other in the aforementioned description, figure visualization objects may be overlapped with each other, or a figure visualization object may be overlapped with a picture visualization object. In this case, the polychrome/monochrome determination is performed, not by scanning pixels of the figure visualization object and determining whether the pixels are polychromic or monochromic, but by referencing color attribute information. Therefore, the aforementioned method of determining the determination target range of the polychrome/monochrome determination by comparing the area of the combined region and a value obtained by adding the areas of individual rectangular regions is not remarkably effective. However, the present invention is similarly applicable to a case where the polychrome/monochrome determination is performed first for the upper visualization object, and the result of the polychrome/monochrome determination for the overlapping visualization object is determined as being polychromic without performing the polychrome/monochrome determination for the lower visualization object when the result of the polychrome/monochrome determination for the upper visualization object is determined as being polychromic.

In addition, if one of the visualization objects covers the entire area of the other visualization object, the polychrome/monochrome determination method described for a case when picture visualization objects are overlapped with each other may also be applicable to a case when figure visualization objects are overlapped with each other or a case when a figure visualization object is overlapped with a picture visualization object.

What is claimed is:

1. A color mode determination apparatus comprising:
   a color mode determining section that obtains image data including a plurality of visualization objects representing visualization targets, performs polychrome/monochrome determination on whether the visualization object is polychromic or monochromic, and performs color mode determination on whether the image data is polychromic image data or monochromic image data based on a result of the polychrome/monochrome determination; and
   an overlap determining section that determines whether a predetermined visualization object is overlapped with other visualization objects when the polychrome/monochrome determination is performed for the predetermined visualization object, wherein
   the color mode determining section changes a determination target range of the polychrome/monochrome determination depending on whether the predetermined visualization object is overlapped with other visualization objects,
   in the color mode determining section, if the overlap determining section determines that the predetermined visualization object is partially overlapped with other visualization objects, a size of a combined region obtained by combining a rectangular region of the predetermined visualization object and a rectangular region of the other visualization objects into a single rectangular region is compared with a value obtained by adding a size of the rectangular region of the predetermined visualization object and a size of the rectangular region of the other visualization objects by considering them as individual rectangular regions,
   the combined region is determined as a determination target range of the polychrome/monochrome determination when the size of the combined region is smaller than the value obtained by the addition, and
   each of the individual rectangular regions is determined as the determination target range of the polychrome/monochrome determination when the value obtained by the addition is smaller than the size of the combined region.

2. The color mode determination apparatus according to claim 1, wherein, if the value obtained by the addition is smaller than the size of the combined region, and each of the individual rectangular regions is determined as the determination target range of the polychrome/monochrome determination, the color mode determining section performs the polychrome/monochrome determination sequentially from an upper visualization object on a print medium where the image data is printed and determines that the image data is polychromic image data without performing the polychrome/monochrome determination for a lower visualization object arranged under the upper visualization object which has been determined as being polychromic when the upper visualization object is determined as being polychromic.

3. A color mode determination apparatus comprising:
   a color mode determining section that obtains image data including a plurality of visualization objects representing visualization targets, performs polychrome/monochrome determination on whether the visualization object is polychromic or monochromic, and performs color mode determination on whether the image data is polychromic image data or monochromic image data based on a result of the polychrome/monochrome determination; and
   an overlap determining section that determines whether a predetermined visualization object is overlapped with other visualization objects when the polychrome/monochrome determination is performed for the predetermined visualization object, wherein
   the color mode determining section changes a determination target range of the polychrome/monochrome determination depending on whether the predetermined visualization object is overlapped with other visualization objects,
   if the overlap determining section determines that an upper visualization object on a print medium where the image data is printed is overlapped to cover the entire area of a lower visualization object, the color mode determining section performs the polychrome/monochrome determination sequentially from the upper visualization object and determines whether the upper visualization object is black and whether an uncovering process is performed,
   the polychrome/monochrome determination is not performed for the lower visualization object when the upper visualization object is black, and the uncovering process is not performed, and
   the polychrome/monochrome determination is performed for the lower visualization object when the upper visualization object is black, and the uncovering process is performed.

4. A color mode determination apparatus comprising:
   a color mode determining section that obtains image data including a plurality of visualization objects representing visualization targets, performs polychrome/monochrome determination on whether the visualization object is polychromic or monochromic, and performs color mode determination on whether the image data is polychromic image data or monochromic image data based on a result of the polychrome/monochrome determination; and an overlap determining section that determines whether a predetermined visualization object is overlapped with other visualization objects when the polychrome/monochrome determination is performed for the predetermined visualization object, wherein the color mode determining section changes a determination target range of the polychrome/monochrome determination depending on whether the predetermined visualization object is overlapped with other visualization objects, if the overlap determining section determines that a lower visualization object on a print medium where the image data is printed is overlapped to cover the entire area of an upper visualization object, the color mode determining section performs the polychrome/monochrome determination sequentially from the upper visualization object, and it is determined that the image data is polychromic image data in the color mode determination without performing the polychrome/monochrome determination for the lower visualization object arranged under the upper visualization object which has been determined as being polychromic when the upper visualization object is determined as being polychromic.

* * * * *